Dec. 7, 1965   J. H. JEFFREE ETAL   3,221,595
LENS FOCUSSING SYSTEMS AND MEANS FOR MOVING LENS MEANS
OF AN OPTICAL PROJECTION SYSTEM
Filed Aug. 6, 1962   4 Sheets-Sheet 1
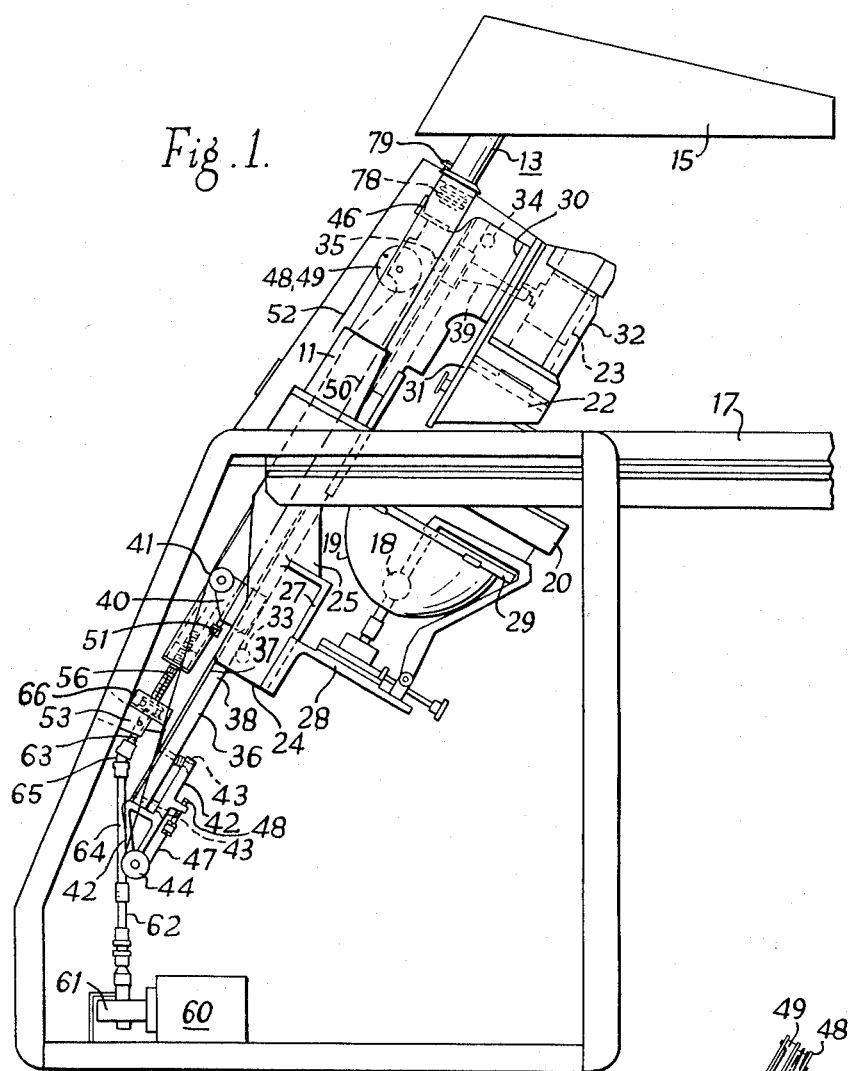

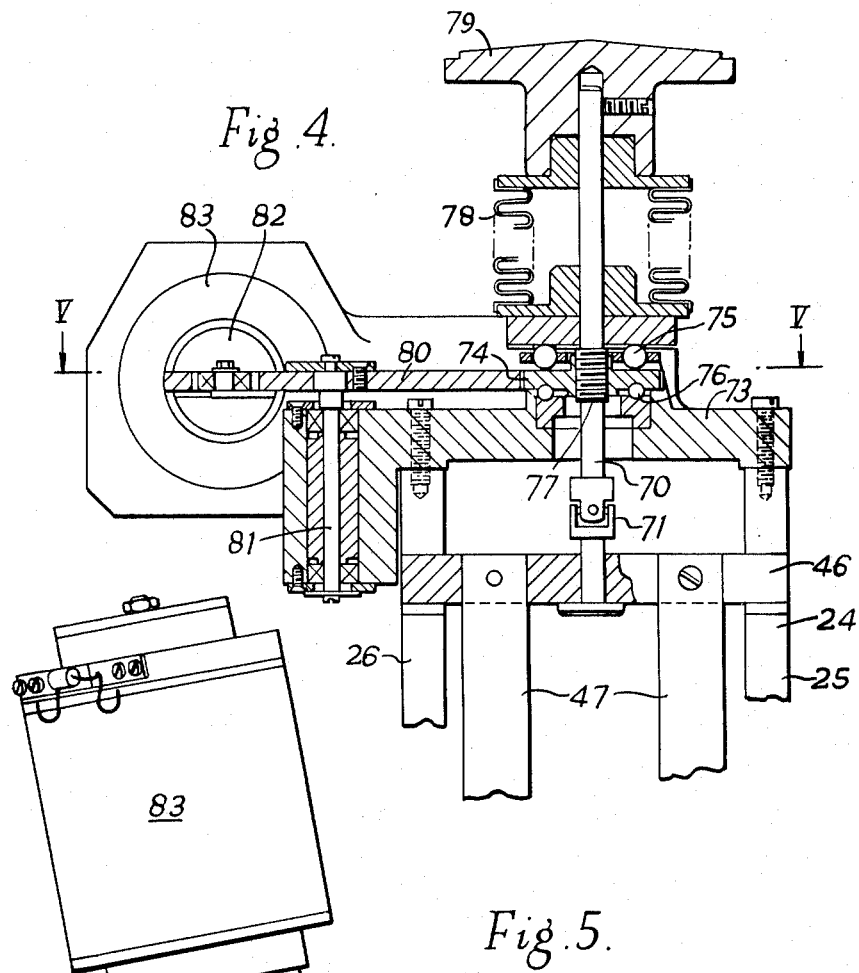

United States Patent Office 3,221,595
Patented Dec. 7, 1965

3,221,595
LENS FOCUSSING SYSTEMS AND MEANS FOR MOVING LENS MEANS OF AN OPTICAL PROJECTION SYSTEM
John Henry Jeffree, London, and Dennis Arthur Sutton, Hatfield, England, assignors to Caps (Research) Limited, Wembley, Middlesex, England
Filed Aug. 6, 1962, Ser. No. 215,073
Claims priority, application Great Britain, Aug. 4, 1961, 28,502/61
15 Claims. (Cl. 88—24)

This invention relates to lens focussing systems and to means for moving lens means of an optical projection system.

The present invention includes a lens focussing system comprising a first movable means constrained to move parallel with the optical axis of the focussing system, a mounting for receiving lens means of the system and arranged to be movable parallel to the optical axis with the first movable means, second movable means constrained to move parallel with the optical axis in a direction opposite to and spaced from the direction of movement of the first movable means by an amount equal to or substantially equal to the focal length of the lens means, control means adapted to effect movement of the second movable means so that the second movable means upon a change in length of the optical path moves by half said change, and coupling means coupling the first and second movable means so that movement of the second movable means upon actuation of the control means imparts movement to the first movable means sufficient to bring the lens means into focussing position in the optical path.

The invention also includes means for moving lens means of an optical projection system between positions in which the lens means is focussed for light of different wave lengths or ranges of wave lengths, comprising an abutment, a mounting adapted to carry lens means of the projection system means coupling the abutment to the mounting and driving means adapted to effect movement of the abutment through a predetermined distance sufficient to cause the coupling means to move the mounting from its initial position corresponding to focus for light of a first wave length or range of wave lengths to a position corresponding to focus for a second wave length or range of wave lengths.

The invention will now be described by way of example with reference to the accompanying drawings, in which:

FIGURE 1 is a side elevation of a microfilm enlarger incorporating a lens focussing system according to the invention;

FIGURE 2 is a diagrammatic view illustrating a detail of FIGURE 1;

FIGURE 4 is a sectional elevation of an adjustment device whereby the focussing system can be adjusted to focus ultra violet light;

FIGURE 5 is a plan view taken on the line V—V of FIGURE 4, and

Figure 3:
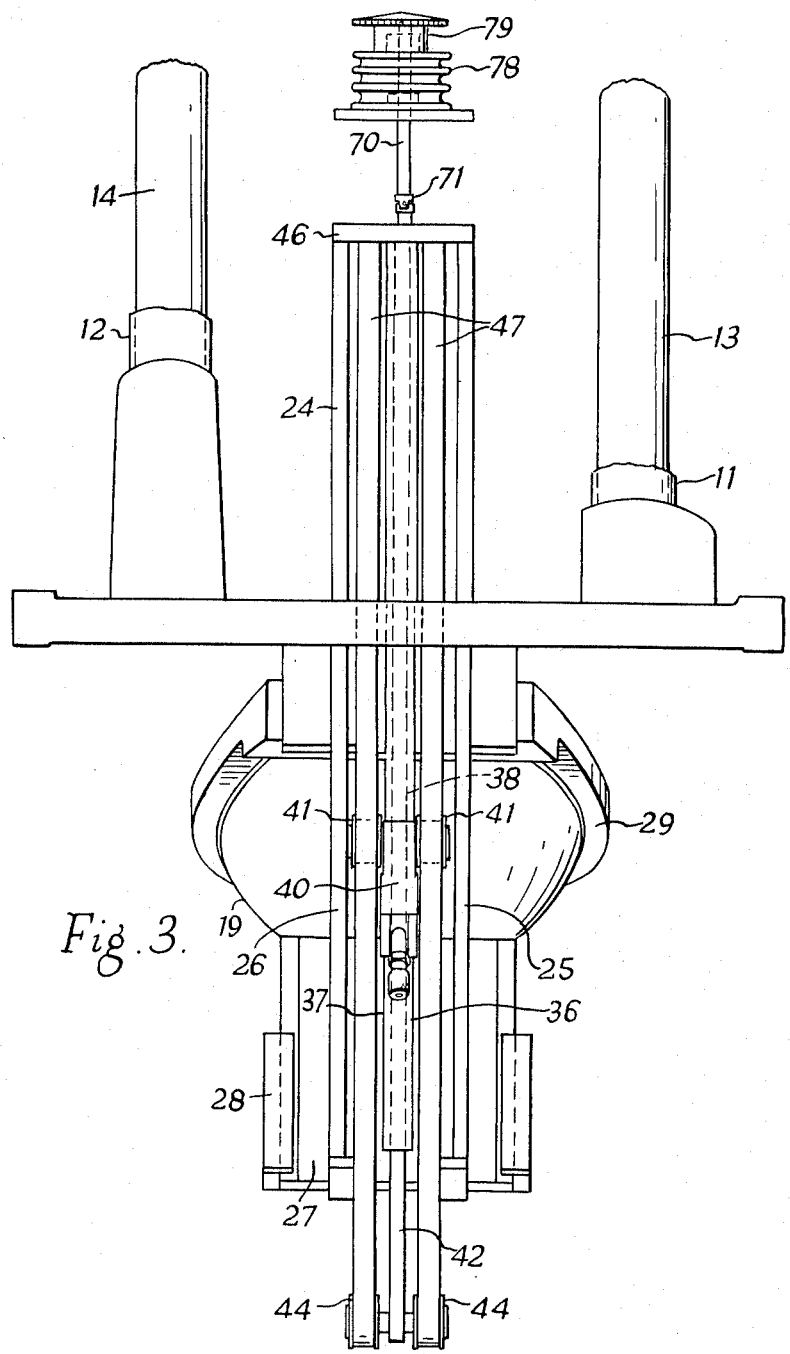
FIGURE 3 is a rear elevation showing parts of the microfilm enlarger of FIGURE 1, and in particular the lens focussing system thereof.

Referring to the drawings, the microfilm enlarger therein illustrated is generally similar to the enlarger described in co-pending application No. 59,908, filed October 3, 1960 and now abandoned, and comprises a framework supporting two fixed tubes 11 and 12 inclined forwardly at an angle of 30° to the vertical direction and within which slide respective tubes 13 and 14 carrying a hood 15 within which is mounted a flat mirror (not shown) inclined upwardly from its front edge at an angle of 15° to the horizontal direction. 17 is the fixed viewing or printing bed of the enlarger. 18 is an ultraviolet lamp, 19 a reflector, 20 a heat filter and 22 represents generally a gate which incorporates a condenser lens and gate lens whilst 23 represents generally the magnifying lens system of the enlarger. Between the gate and the heat filter is provided a shutter mechanism (not shown). The lens system 23 and gate 22 are generally of the form described in our co-pending application No. 59,908, filed October 3, 1960 and now abandoned.

The flat mirror in the hood 15 serves to reflect vertically downwards an image on the bed 17. It will be apparent therefore that as the optical axis of the enlarger in advance of the flat mirror as hereafter described, extends parallel with the tubes 13 and 14, movement of the mirror varies the length of the optical path, any actual movement of the mirror being directly proportional to the change in length of the optical path.

The lamp 18, reflector 19, heat filter 20, gate 22, and lens 23 are aligned on the optical axis of the enlarger which extends upwardly and forwardly at an inclination of 30° to the vertical, i.e., parallel to the tubes 13 and 14. To this end the enlarger includes a main spine 24 fixed to the framework, and extending upwardly and forwardly at an inclination of 30° to the vertical. The spine 24 consists of mutually spaced parallel side plates 25 and 26 which at their lower edge are connected by a plate 27, the latter carrying an adjustable bracket 28 on which the lamp 18 is mounted. The upper rim of the reflector 19 is carried in a support 29 which in turn is secured to the forward edges of the plates 25 and 26. The heat filter 20 is likewise mounted on the front edges of the plates 25 and 26.

Upper parts 30 of the front edges of plates 25 and 26, pendantly carry a plate 31 provided with a longitudinal slot (not shown) for a purpose hereinafter described. The plate 31 towards its lower end has mounted thereon the gate 22, on the upper part of this plate is carried the housing 32 of the lens 23.

Mounted in rollers 33, 34 and 35 between the side plates of the spine is a beam 36, which is constrained by the rollers so that it can move only in a direction parallel with the optical axis. The beam 36 is of T-section having a flange 37 and web 38, and on an upper part of the beam is carried a support 39 which projects through the longitudinal slot in the plate 31, and on the forward end of which is mounted the lens system 23.

On the flange 37 of the beam 36 is slidably engaged a block 40 on opposite faces of which are rotatably mounted similar pulleys 41 the common axis of which extends in a direction parallel to the normal to the optical axis. Also on a lower end of the beam 36 which projects below the spine 24 is carried a member 42 which is secured to the beam 36 by screws 43. The member 42 non-rotatably carries on respective opposite sides thereof co-axial pulleys 44, of the same diameter as pulleys 41, and the common axis of which is parallel with the axis of the pulleys 41. It will be appreciated that by adjustment of the screws 43 the perpendicular distance between the axes of pulleys 41 and 44 can be varied. It is a requirement of this invention that this distance is made equal to the focal length of the lens system 23. Accordingly, the adjustment provided by the screws 43 enables lens systems of different focal lengths to be used.

Secured at corresponding ends thereof to an abutment 46 which extends transversely between the side plates 25 and 26 of the spine 24 are two metal tapes 47 each of the same fixed length which extend in mutually parallel relationship each over one of the pulleys 41 on the block 40 and one of the pulleys 44 on the member 42. After passing round the pulleys 44 the tapes 47 are secured to an anchorage 48 which is adjustable longitudinally and mounted on the member 42.

It will be appreciated that the block 40 can slide along the beam 36 and it is a requirement of this invention that the movement of the block shall correspond to half the change in length of the optical path occasioned by movement of the flat mirror in the hood 15. This requirement is satisfied by providing on the spine 24 two pulley elements 48 and 49 of different diameters arranged co-axially side by side. These pulley elements are keyed together, their common axis being parallel with the axes of the pulleys 41 and 44. A first wire 50 secured at one end thereof to the pulley element 48 extends around that pulley element and downwardly to the block 40 where it is secured at anchorage 51 whilst a second wire 52 which is secured at one end thereof to the pulley element 49 extends around that pulley element and thence downwardly to a transverse beam 53 on the frame work of the enlarger. On the beam 53 are mounted two transversely spaced pulleys 54 and 55 which are embraced by the wire 52 and from which the wire 52 extends to an anchorage 56 secured to a lower end of the tube 14.

The movement of the hood 15 and flat mirror mounted therein is effected by an electric motor 60 which through reduction gearbox 61 drives a spindle 62, the latter having an upper forwardly and upwardly inclined part 63 connected to a vertical lower part 64 by a universal joint 65. The upper part of the spindle extends through a thrust race 66 which is mounted on the transverse beam 53 and which constrains the part 63 for purely rotational movement. The part 63 is externally threaded and engages in an internally threaded bush 141 mounted at the bottom of the tube 14. When the motor 60 drives the spindle, the latter rotates and the tubes 13 and 14 move axially with respect to the spindle part 63. The hood 15 and its mirror is thus raised or lowered depending on the sense of rotation of the motor 60.

The lens system 23 is focussed for white light by movement of the beam 36. However, it is desirable to provide for further adjustment whereby the lens system is moved upon actuation of the shutter mechanism to permit the passage of ultraviolet light along the optical axis. To this end the abutment 46 to which the pulley tapes 47 are secured is connected at its mid-point to an upright spindle 70 which includes a universal joint 71. The spindle 70 passes upwardly through a support member 73 carried on the spine 24 and has mounted thereon a gear wheel 74 which is engaged from above and below by bearings 75 and 76. The gear wheel 74 is formed with a central threaded aperture which engages a threaded part 77 of the spindle 70. On the spindle 70 above the support piece is a bellows spring 78 above which is engaged on the spindle a knob 79 manual rotation of which effects adjustment of the height of the abutment 46.

The gear wheel 74 meshes with a sector gear 80 which is pivotally mounted intermediate its ends on the support member 73 by means of a shaft 81. The end of the sector gear remote from the end thereof which meshes with the gear wheel 74 is pivotally connected to a plunger 82 of a solenoid 83. When the solenoid 83 is energised, the plunger 82 moves axially and causes the sector gear 80 to rotate the gear wheel 74. Rotation of the gear wheel 74 in turn effects axial movement of the spindle 70 and therefore vertical movement of the arm abutment 46.

Figure 6:
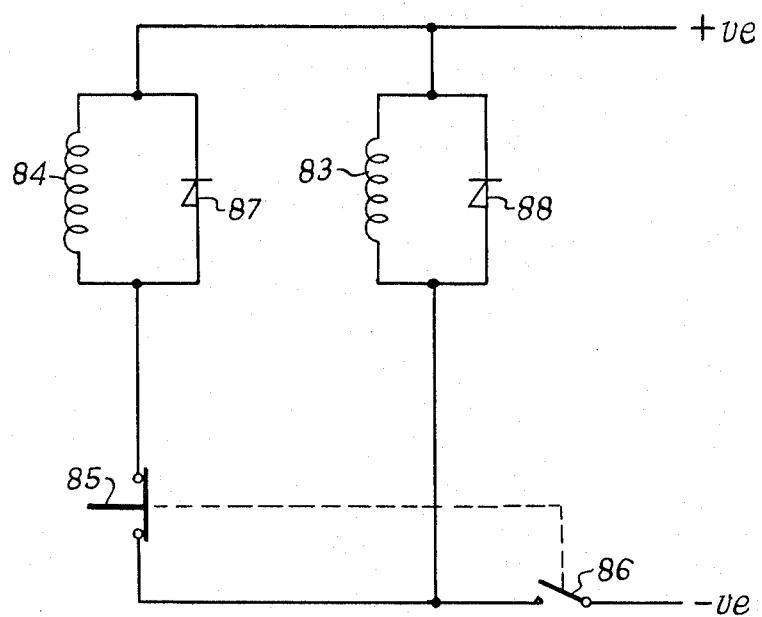
FIGURE 6 is a diagram illustrating an electrical circuit associated with the device of FIGURES 4 and 5.

The solenoid 83 is arranged to be energised prior to the opening of the shutter so that the lens system will be focussed for ultra-violet light during the whole of the period that the shutter is open. To this end, as seen in FIGURE 6, solenoid 83 is connected in parallel with a series arrangement including a shutter solenoid 84 and a normally closed switch 85, the parallel arms of the circuit containing the solenoid coils are disposed across a direct current supply, in the negative arm of which is arranged a switch 86. On depressing the normally closed switch 85 the switch 86 is closed and this in turn primes a timing mechanism. Closure of the switch 86 also energises the solenoid 83 which in turn causes the arm 46 to move. The movement of the abutment 46 effects positioning of the lens system 23 focussing that system for ultra-violet light. Release of the normally closed switch 85 effects energising of the shutter solenoid and the shutter is thereby opened. The shutter remains open until the timing mechanism mechanically opens the switch 86 whereupon the solenoids 83 and 84 are de-energised so that the system is re-focussed for white light and the shutter is closed. The rectifiers 87 and 88 disposed in parallel with the solenoids 84 and 83 respectively serve to protect the switches.

Upon moving the flat mirror in the hood 15 by operation of the motor 60, to effect shortening of the optical path, the wires 50 and 52 are wound relative to their associated pulley elements 48 and 49 with the result that movement of the block 40 occurs relative to the beam 36. By appropriate choice of the diameters of the pulley elements 48 and 49, this movement of the block is made equal to half the change in length of the optical path effected by movement of the mirror in the hood 15. When the mirror is moved to lengthen the optical path the wires 50 and 52 are unwound with respect to the pulley elements 48 and 49 and the block 40 is raised.

The distance between the pulleys 41 on the block 40 and the pulleys 44 at the lower end of the beam 36 is made equal to $$\frac{f}{2M}(M^2+1)$$

where $f$ equals the focal length of the lens system 23, and
$M$ equals the magnification of the lens system 23 for a known length of optical path.

It can be shown that when the distance between the pulleys 41 on the block 40 and the pulleys 44 on the beam 36 is made equal to the above value, provided the perpendicular distance between the axes of the pulleys 41 and 44 is maintained at a value equal to the focal length of the lens system 23, then movement imparted to the beam 36 by movement of the block 40 (which movement is equal to half the change in the length of the optical path) is such as to maintain the lens system in focus.

In operation of the enlarger, when it is desired to change the size of the image, the flat mirror in the hood 15 is moved as a result of movement of the tubes 13 and 14 by the motor 60 and this causes movement of the block 40 on the beam 36. Since the parallel tapes 47 engaging the block pulleys 41 and beam pulleys 44 are of fixed length, movement of the block in one direction imparts movement to the beam 36 in the opposite direction this movement of the beam re-focussing the lens system for the new length of the optical path.

We claim:
1. A lens focussing system comprising a first movable means constrained to move parallel with the optical axis of the focussing system, a mounting for receiving a lens means of the system and arranged to be movable parallel to the optical axis with the first movable means, second movable means constrained to move parallel with the optical axis in a direction opposite to the direction of movement of the first movable means, the second movable means including pulley means spaced from the direction of movement of the first movable means and having an axis which extends parallel with a direction normal to the optical axis, control means adapted to effect movement of the second movable means so that the second movable means upon a change in length of the optical path moves by a proportional amount, and coupling means including a band or the like of fixed length anchored at its ends respectively to an abutment and to the first movable means and co-operating at an intermediate location thereon with the pulley means of the second movable means, whereby movement of the second movable means upon actuation of the control means imparts movement to the first movable means sufficient to bring the lens means into focussing position in the optical path.

2. A lens focussing system as claimed in claim 1, wherein means are provided for changing the length of the optical path by varying the distance between the lens means and the optical image.

3. A lens focussing system as claimed in claim 2, wherein means for changing the length of the optical path include a flat mirror disposed between the lens means and the optical image and mounted on elements movable in a direction parallel with the optical axis.

4. A lens focussing system as claimed in claim 1, wherein the pulley means is spaced from the direction of movement of the first movable means by an amount substantially equal to the focal length of the lens means, and the control means is adapted to effect movement of the second movable means so that the second movable means upon a change in length of the optical path moves by half said change.

5. A lens focussing system as claimed in claim 4, wherein the first movable means includes a pulley having an axis which extends parallel with a direction normal to the optical axis, and the band co-operates with both the pulley means, the length of the band between the points of contact thereof with pulleys of the first and second movable means being equal to:

$$\frac{f}{2M}(M^2+1)$$

where $f$ equals the focal length of the lens system 23, and
$M$ equals the magnification of the lens system 23 for a known length of optical path.

6. A lens focussing system as claimed in claim 5, wherein the first movable means comprise an elongated beam constrained for movements parallel with the optical axis and a pulley mounted on the beam with its axis parallel to the normal to the optical axis, the second movable means comprise a block mounted on the beam for sliding movements relative to the beam and parallel with the optical axis and a pulley mounted on the block and disposed with its axis parallel with the axis of the pulley on the beam, the coupling means include a band or the like of fixed length which co-operates with the pulley on the block and the pulley on the beam and which at opposite ends thereof is secured respectively to an abutment and to the beam, whilst the control means are adapted to effect movement of the block through one half the change in length of the optical path.

7. A lens focussing system as claimed in claim 6, wherein means for changing the length of the optical path include a flat mirror disposed between the lens means and the optical image and mounted on elements movable in a direction parallel with the optical axis, and the control means include drive means for effecting movement of the elements carrying the mirror and two pulleys rotatable in unison each having a wire wound thereon the free ends of the wires being secured respectively to one of the elements carrying the mirror and to the block and the pulley diameters being so chosen that movement of the block upon operation of the drive means is rendered equal to half the change in length of the optical path effected by movement of the mirror.

8. A lens focussing system as claimed in claim 7, wherein means are provided for effecting movement of the abutment parallel with the optical axis to reposition the lens means for re-focussing the latter from a position corresponding with focus of the system for white light to a position in which the system is focussed for light of a specific wave length.

9. A lens focussing system as claimed in claim 8, wherein the means for effecting movement of the abutment includes, means for actuating a shutter disposed in the optical path and delay means whereby upon operation of the means for actuating the shutter, the latter remains closed until the means for effecting movement of the abutment have operated to position the lens means for focussing the latter for the wave length of light transmitted by the shutter upon opening thereof.

10. A lens focussing system as claimed in claim 1, comprising driving means adapted to effect movement of the abutment through a predetermined distance sufficient to cause the coupling means to move the mounting from its initial position corresponding to focus for light of a first wave length or range of wave lengths to a position corresponding to focus for a second wave length or range of wave lengths.

11. A lens focussing system as claimed in claim 10, wherein the means for effecting movement of the abutment include shutter actuating means and delay means whereby upon operation of the shutter actuating means the delay means are effective to prevent opening of the shutter before movement of the abutment takes place.

12. A lens focussing system as claimed in claim 11, wherein the means for effecting movement of the abutment include a solenoid having an armature coupled by gear means to the abutment, the solenoid upon energisation thereof effecting predetermined movement of the armature which movement is transmitted by the gear means to produce corresponding movement of the abutment.

13. A lens focussing system as claimed in claim 12, wherein the abutment is connected to a rotatable shaft which includes an externally threaded section co-operating with an internally threaded aperture of a first gear wheel confined for motion in a rotational sense only relative to the shaft, the gear wheel having teeth at its periphery which mesh with teeth on an arm pivotally secured intermediate its ends for rotation in the plane of the gear wheel and further pivotally secured at the end thereof remote from the gear to the armature.

14. A lens focussing system as claimed in claim 13, wherein on the end of the shaft remote from the abutment is carried a knob for manually adjusting the axial position of the shaft.

15. A lens focussing system as claimed in claim 1, wherein the system forms part of a microfilm enlarger.

References Cited by the Examiner

UNITED STATES PATENTS

| | | | |
|---|---|---|---|
| 2,133,978 | 10/1938 | Draeger | 88—24 |
| 2,437,898 | 3/1948 | Swanson | 88—24 |
| 3,146,661 | 9/1964 | Young | 88—24 |

NORTON ANSHER, *Primary Examiner.*

EMIL G. ANDERSON, *Examiner.*